United States Patent
Weiler

(10) Patent No.: US 9,716,588 B2
(45) Date of Patent: Jul. 25, 2017

(54) METHOD FOR GENERATING A KEY IN A NETWORK AND USERS CONFIGURED FOR THIS PURPOSE

(71) Applicant: Robert Bosch GmbH, Stuttgart (DE)

(72) Inventor: Harald Weiler, Goeppingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 6 days.

(21) Appl. No.: 14/706,111

(22) Filed: May 7, 2015

(65) Prior Publication Data

US 2016/0149698 A1    May 26, 2016

(30) Foreign Application Priority Data

May 13, 2014  (DE) .................. 10 2014 208 964

(51) Int. Cl.
*H04L 29/06* (2006.01)
*H04L 9/08* (2006.01)
*H04L 9/12* (2006.01)

(52) U.S. Cl.
CPC ............ *H04L 9/083* (2013.01); *H04L 9/0838* (2013.01); *H04L 9/0872* (2013.01); *H04L 9/12* (2013.01); *H04L 63/06* (2013.01)

(58) Field of Classification Search
CPC ..... H04L 9/083; H04L 9/0838; H04L 9/0872; H04L 9/12; H04L 63/06

USPC .......................................................... 713/155
See application file for complete search history.

(56) References Cited

U.S. PATENT DOCUMENTS

| | | | |
|---|---|---|---|
| 7,239,701 B1* | 7/2007 | Ogishi | H04L 9/3013 380/28 |
| 9,037,859 B2* | 5/2015 | O'Brien | H04L 9/3271 709/229 |
| 2009/0129590 A1* | 5/2009 | Konuma | H04L 9/0838 380/44 |
| 2011/0167273 A1* | 7/2011 | Maas | H04L 9/083 713/171 |
| 2015/0288517 A1* | 10/2015 | Evans | H04L 9/0883 713/168 |

FOREIGN PATENT DOCUMENTS

| | | |
|---|---|---|
| WO | 96/23376 | 8/1996 |
| WO | 2006/081122 | 8/2006 |

* cited by examiner

*Primary Examiner* — Michael S McNally
(74) *Attorney, Agent, or Firm* — Gerard Messina

(57) ABSTRACT

A method for generating a shared key between two users of a network. The two users respectively have at least one clock as well as an arrangement for detecting a certain surroundings variable. The two users detect the certain surroundings variable synchronously at respectively predefined points in time or start a detection of a course of the surroundings variable. Finally, the two users respectively generate the shared key taking values detected in this manner for the surroundings variable into account.

12 Claims, 1 Drawing Sheet

METHOD FOR GENERATING A KEY IN A NETWORK AND USERS CONFIGURED FOR THIS PURPOSE

CROSS REFERENCE TO RELATED APPLICATION

The present application claims priority to Application No. DE 10 2014 208 964.6, filed in the Federal Republic of Germany on May 13, 2014, which is incorporated herein in its entirety by reference thereto.

FIELD OF INVENTION

The present invention relates to the protection of data transmissions between users of a network.

BACKGROUND INFORMATION

Secure communication between various devices is becoming more and more important in an increasingly networked world and represents an essential requirement for the acceptance and therefore also the economic success of the corresponding applications in many areas of application. This includes—depending on the application—various protection goals, for example, ensuring the confidentiality of the data to be transmitted, mutual authentication of the participating nodes, or securing the data integrity.

To achieve these protection goals, suitable cryptographic methods are typically used, which may generally be divided into two different categories: symmetrical methods, in which transmitter and receiver have the same cryptographic key, and asymmetrical methods, in which the transmitter encrypts the data to be transmitted using the public key (i.e., which is also possibly known to a potential attacker) of the receiver, but the decryption may only take place using the associated secret key, which is ideally only known to the receiver. secret keys from channel parameters is discussed in WO 2006/081122 A2. In this process, pilot signal sequences (which may be ones known to both sides) are usually initially sent from the first node to the second node and then pilot signal sequences are sent from the second node to the first node. The respective receiver may estimate channel properties from the received pilot signal sequences and derive suitable parameters for a key generation therefrom. However, if the time deviation between the measurements of the two nodes is too great during this process, different keys may result and the effort for a subsequent key comparison may increase or even make a shared key generation impossible.

SUMMARY OF THE INVENTION

The present invention relates to methods according to the independent method claims and users on a network or networks which are configured to carry out one of the methods. Furthermore, the present invention relates to a computer program which is configured to carry out one of the methods.

It is provided that a user of a network detects a surroundings variable at predetermined times and derives a key for a protected communication from values for the surroundings variable. A second user, who has corresponding an arrangement and the pieces of information about the predetermined times, may determine the same key in the same manner. In this manner, a shared, secret key is possible which enables a protected communication between the two users.

The advantages of such a method result from the fact that the secret, on which the protected communication is based, is the predetermined points in time. This information must also be managed similarly to symmetrical keys and provided to the participating network users. However, a potential attacker may do less damage with points in time obtained in an unauthorized manner than with a key obtained in an unauthorized manner. In addition to the piece of information about the points in time, the attacker must also have an arrangement to detect the required surroundings variable and must be in sufficient proximity of the users at the predefined points in time in order to detect sufficiently similar values for the surroundings variable.

If the method is always carried out, for example, to replace old keys with new keys, the attacker must always be on location at the determined times. The method is therefore also particularly advantageous when the previous shared keys are hereby replaced. These may either be keys which had also been generated using such a method, or other keys. In this way, through a re-creation based on the surroundings variables measurements at predetermined times, attackers who knew an old key may also be pushed out of the network again or at least excluded from the protected communication. For additional protection of the method, a linkage with the previous key is also possible.

In order to ensure that the predetermined times are equally adhered to for all users, synchronizations between the users are advantageous. In this way, more precise surroundings variables values may also be used since there is less insecurity in the exact points in time. In this embodiment, a potential attacker faces the additional obstacle of possibly also requiring a corresponding synchronization. The synchronization may in this case be carried out in an unencrypted manner, since the secret lies in the points in time.

Advantageously, the users receive the predetermined points in time from one identical, central instance of the network with which they have, for example, already respectively established a protected communication. Other options are also possible, for example that the users receive the times from different sources.

The present invention is described in greater detail hereafter with reference to the accompanying drawing and based on exemplary embodiments.

BRIEF DESCRIPTION OF THE DRAWING

The FIGURE schematically shows an exemplary network including two users which have an arrangement to generate one shared, secret key.

DETAILED DESCRIPTION

Figure 1:
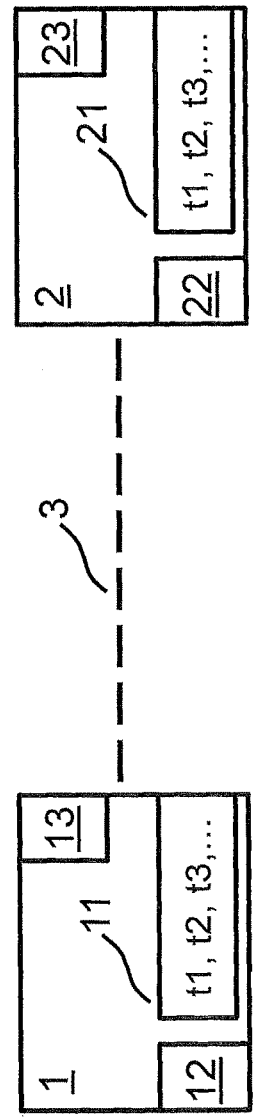

The present invention relates to a method for automatically generating symmetrical, cryptographic keys based on physical properties of a surroundings variable of a node of a wireless or wired communication system, i.e., of a user of a network.

In the case of a use in two users, symmetrical encryption methods may thereby be used to implement various security goals without high outlay, which is of interest in particular for applications in the field of machine-to-machine communication, i.e., for example, for the transmission of data between various sensor and/or actuator nodes.

The corresponding surroundings variable of the two nodes must for this purpose have a sufficient inherent randomness, meaning sufficient chronological variance for it to be possible to generate a key with the desired entropy. In addition, the surroundings variable may not spatially fluctuate too highly between the two usually separated nodes so that both nodes detect sufficiently matching values of the surroundings variable from which one matching, shared key may be generated.

This may take place as described hereafter, for example. Using appropriate arrangement, two nodes ascertain a certain surroundings variable synchronously with one another based on points in time available to both sides. For this purpose, the nodes are to be able to access a time arrangement (clocks) which are sufficiently synchronous to one another, as well as have sensors with which the two nodes may also detect the same certain surroundings variable. If necessary, both nodes also have an arrangement, which may be present in both nodes in the same format, to ascertain values for the surroundings variable from the detected data via appropriate computation methods.

The thereby ascertained values are suitably quantified by both nodes. This may be followed by measures for noise reduction and/or error reduction, for example, by a corresponding decoding of errors. With the aid of suitable mechanisms, a calibration of the quantified values between the nodes is then carried out, which may be done using a public protocol. This is necessary, since, due to measuring inaccuracies, noise, interferences, etc., both nodes generally initially have not customarily ascertained identical bit sequences. The calibration is to be configured so that a potential attacker who may listen in on the exchanged data may not readily infer the ascertained bit sequences therefrom. For this purpose, for example, parity bits may be exchanged between the nodes. Optionally, a key validation (for example, an entropy estimation) and a key improvement (for example, by key compaction via hash value calculation) may also be carried out. Finally, corresponding symmetrical keys are generated on the basis of the calibrated, quantified values.

In addition, with the aid of this approach, a re-keying may be carried out regularly without great effort, i.e., a recalculation of the keys to be used. Furthermore, complex, computing-intensive asymmetrical methods do not have to be used.

In the described methods, it is presumed that the (physical) surroundings variable of the two nodes has chronologically sufficient value fluctuations in order to derive appropriate bit sequences therefrom, which are suitable as a basis for a key generation in the nodes (in particular sufficient random properties.)

Due to the chronological synchronization of the value detection between the two nodes, matching or strongly correlated values for the variable may be ascertained despite the high chronological variation of the surroundings variable. In this way, the respective local derivation of a shared key from the thus detected values for the surroundings variable is also possible. It is presumed here that the surroundings variable across the distance between the nodes is spatially sufficiently constant so that the respective nodes may ascertain matching or sufficiently correlated values for the surroundings variable despite the spatial distance in order to obtain sufficiently similar bit sequences from which matching keys may be obtained.

The thus ascertained matching keys may then be used for symmetric encryption methods.

The clocks may be synchronized with one another in both nodes at the outset of the method. This may take place using known methods, for example, according to IEEE 1588. An encryption of the synchronization data is possible, but generally not necessary. Ideally, clocks with a high operating stability are used in the two nodes for the method so that a synchronization between the users does not have to be carried out too frequently.

Both nodes detect the surroundings variable at predetermined target times. These target times are to be secret; this means that they are known only to those two nodes and, if necessary, trustworthy additional instances. An attacker should not have this information; it should also not be transmitted in an unencrypted form between the two nodes or to the two nodes. According to different specific embodiments, the points in time may be transmitted from one or multiple trustworthy instances, which have protected transmission paths to the two nodes, to those nodes in an encrypted form. Alternatively, the two nodes may negotiate points in time in a communication encrypted with one of the previous keys (or one of the nodes may transmit corresponding points in time to the other.) In an additional, less secure, but particularly easily implemented alternative, a transmission of the points in time might be started manually to the two nodes or between the two nodes if no attacker is to be expected at the moment.

At the shared target points in time, both nodes measure a chronologically variable surroundings variable. This may be radiation intensity or radiation spectrum, light, temperature, noise level or noise spectrum, the concentration of substances in the air, electromagnetic field strengths, etc., or combinations thereof.

The process of the data detection may be repeated periodically or at predetermined points in time in order to generate a secure key or a series of keys. Such consecutive keys gained from measuring variables uncorrelated with one another are independent from one another. The method may also be used in order to replace or modify existing keys (whether generated using a corresponding method or not.)

The difference to known approaches, for example, physical layer security, in which the channel properties between the two nodes are measured, is that there a potential attacker does not see the same channel properties as the two nodes communicating with one another via the channel; in the approach here, however, the secret is in the predefined points in time of the detection of the pieces of information (enabled by synchronized clocks.)

In FIG. 1, a first node is shown as an exemplary embodiment, which has a memory 11 in which predetermined points in time t1, t2, t3, . . . are stored at which a detection of a certain surroundings variable is to take place using sensor 12 of node 1. Node 1 determines the reaching of the predetermined points in time using its clock 13. Correspondingly, node 2 has a memory 21 in which the same predetermined points in time t1, t2, t3, . . . are stored at which a detection of a certain surroundings variable is to take place using sensor 22 of node 2. Node 2 determines the reaching of the predetermined points in time using its clock 23. From the synchronously detected values of the surroundings variable, nodes 1 and 2 now respectively derive one shared, i.e., symmetric, key. Using this key, nodes 1 and 2 may now protect their communication via shared communication link 3. Via this communication link 3, a synchronization of clocks 13 and 23 of nodes 1 and 2 may also take place at the outset. In the corresponding specific embodiments, a negotiation or transmission of the predetermined points in time may also take place between the nodes.

What is claimed is:

1. A method for generating a shared key between two users of a network, the two users respectively having at least one clock and an arrangement for detecting a certain surroundings variable, the method comprising:

detecting, via the two users, synchronously at respectively predefined points in time the certain surroundings variable, wherein the detecting of the surroundings variable includes measuring, via a respective sensor in each of the two users, a physical property of a surroundings external to the two users and to which both of the two users are exposed; and generating, via the two users, the shared key, and respectively taking values detected in this manner for the surroundings variable into account, wherein the physical property includes at least one of a concentration of a substance in the air and an electromagnetic field strength.

2. The method of claim 1, wherein the shared key replaces one previous shared key.

3. The method of claim 1, wherein the respective clocks of the two users are initially synchronized with one another.

4. The method of claim 1, wherein the users receive the predefined points in time via already protected communication links from the same user or from different other users.

5. A method for generating a shared key between two users of a network, the two users respectively having at least one clock and an arrangement for detecting a certain surroundings variable, the method comprising:

detecting, via the two users, synchronously at respectively predefined points in time the certain surroundings variable, wherein the detecting of the surroundings variable includes measuring, via a respective sensor in each of the two users, a physical property of a surroundings external to the two users and to which both of the two users are exposed; and generating, via the two users, the shared key, and respectively taking values detected in this manner for the surroundings variable into account, wherein the shared key replaces one previous shared key, and, wherein the shared key is generated taking also the previous shared key into account.

6. A method for generating a shared key between two users of a network, the two users respectively having at least one clock and an arrangement for detecting a certain surroundings variable, the method comprising:

detecting, via the two users, synchronously at respectively predefined points in time the certain surroundings variable, wherein the detecting of the surroundings variable includes measuring, via a respective sensor in each of the two users, a physical property of a surroundings external to the two users and to which both of the two users are exposed; and generating, via the two users, the shared key, and respectively taking values detected in this manner for the surroundings variable into account, wherein the respective clocks of the two users are initially synchronized with one another, and, wherein the synchronization of the respective clocks takes place in an unencrypted form.

7. A method for generating a key in one user of a network, the user having a clock and an arrangement for detecting a certain surroundings variable, the method comprising:

detecting, via the user, at predefined points in time the certain surroundings variable, wherein the detecting of the surroundings variable includes measuring, via a sensor in the user, a physical property of a surroundings external to the user and to which the user is exposed; and generating, via the user, the key and taking values detected in this manner for the surroundings variable into account, the user using the key for a protected communication with at least one second user of the network, wherein the physical property includes at least one of a concentration of a substance in the air and an electromagnetic field strength.

8. A user of a network, comprising:

a clock and an arrangement for detecting a certain surroundings variable, wherein the arrangement includes a sensor that measures a physical property of a surroundings external to the user and to which the user is exposed; and an arrangement to detect at predefined points in time the certain surroundings variable to generate a key taking values detected in this manner for the surroundings variable into account, and to use the key for a protected communication with at least one second user of the network, wherein the physical property includes at least one of a concentration of a substance in the air and an electromagnetic field strength.

9. A network, comprising:

at least two users respectively having at least one clock and an arrangement for detecting a certain surroundings variable wherein the arrangement includes a sensor respectively in each of the at least two users and that measures a physical property of a surroundings that is external to the at least two users and to which both of the users are exposed;

wherein the users have an arrangement to detect at predefined points in time the certain surroundings variable synchronously with one another and to generate a shared key, respectively taking values detected in this manner for the surroundings variable into account, wherein the physical property includes at least one of a concentration of a substance in the air and an electromagnetic field strength.

10. A non-transitory computer readable medium having a computer program, which is executable by a processor, comprising:

a program code arrangement having program code for generating a shared key between two users of a network, the two users respectively having at least one clock and an arrangement for detecting a certain surroundings variable, by performing the following:

detecting, via the two users, synchronously at respectively predefined points in time the certain surroundings variable, wherein the detecting of the surroundings variable includes measuring, via a respective sensor in each of the two users, a physical property of a surroundings external to the two users and to which both of the two users are exposed; and generating, via the two users, the shared key, and respectively taking values detected in this manner for the surroundings variable into account, wherein the physical property includes at least one of a concentration of a substance in the air and an electromagnetic field strength.

11. The computer readable medium of claim 10, wherein the shared key replaces one previous shared key.

12. A method for generating a shared key between two users of a network, the two users respectively having at least one clock and an arrangement for detecting a certain surroundings variable, the method comprising:

detecting, via the two users, synchronously at respectively predefined points in time the certain surroundings variable, wherein the detecting of the surroundings variable includes measuring, via a respective sensor in each of the two users, a physical property of a surroundings external to the two users and to which both of the two users are exposed; and generating, via the two users, the shared key, and respectively taking values detected in this manner for the surroundings variable into account, wherein the two users are sufficiently close to one another that a chronological variation of the physical property is the same for both of the users, so that a first value of the surroundings variable measured by a first of the two users one of matches and is correlated to a second value of the surroundings variable measured by a second of the two users.

\* \* \* \* \*